US012633569B2

(12) United States Patent
Lee et al.

(10) Patent No.: US 12,633,569 B2
(45) Date of Patent: May 19, 2026

(54) SOLID ELECTROLYTE MEMBRANE AND ALL-SOLID-STATE BATTERY COMPRISING THE SAME

(71) Applicant: LG Energy Solution, Ltd., Seoul (KR)

(72) Inventors: Jung Pil Lee, Daejeon (KR); Lak Young Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 549 days.

(21) Appl. No.: 18/033,769

(22) PCT Filed: Aug. 24, 2022

(86) PCT No.: PCT/KR2022/095120
§ 371 (c)(1),
(2) Date: Apr. 25, 2023

(87) PCT Pub. No.: WO2023/033635
PCT Pub. Date: Mar. 9, 2023

(65) Prior Publication Data
US 2023/0307706 A1     Sep. 28, 2023

(30) Foreign Application Priority Data

Aug. 30, 2021     (KR) ........................ 10-2021-0114511

(51) Int. Cl.
| | |
|---|---|
| *H01M 10/0565* | (2010.01) |
| *H01M 10/0562* | (2010.01) |
| *H01M 50/446* | (2021.01) |
| *H01M 50/489* | (2021.01) |
| *H01M 50/497* | (2021.01) |

(52) U.S. Cl.
CPC ... *H01M 10/0565* (2013.01); *H01M 10/0562* (2013.01); *H01M 50/446* (2021.01); *H01M 50/489* (2021.01); *H01M 50/497* (2021.01); *H01M 2300/0082* (2013.01); *H01M 2300/0091* (2013.01)

(58) Field of Classification Search
None
See application file for complete search history.

(56) References Cited

U.S. PATENT DOCUMENTS

| | | | |
|---|---|---|---|
| 2006/0046149 A1* | 3/2006 | Yong ................... | H01M 50/446 |
| | | | 428/407 |
| 2010/0124705 A1 | 5/2010 | Naoi et al. | |
| 2017/0133710 A1 | 5/2017 | Yoon et al. | |
| 2018/0083307 A1 | 3/2018 | Makino et al. | |
| 2019/0109311 A1 | 4/2019 | Shin et al. | |

(Continued)

FOREIGN PATENT DOCUMENTS

| | | |
|---|---|---|
| CN | 104466239 B | 2/2017 |
| CN | 112421114 A | 2/2021 |

(Continued)

OTHER PUBLICATIONS

Machine Translation of KR 10-2020-0050817A (Year: 2020).*

*Primary Examiner* — Gregg Cantelmo
(74) *Attorney, Agent, or Firm* — Bryan Cave Leighton Paisner LLP

(57) ABSTRACT

A solid electrolyte membrane and an all-solid-state battery comprising the same are provided. The solid electrolyte membrane comprises a solid electrolyte in the form of particles and an additive having a linear structure.

7 Claims, 9 Drawing Sheets

Solid electrolyte membrane

Solid electrolyte

Additive having linear structure

(56)                 References Cited

U.S. PATENT DOCUMENTS

| | | |
|---|---|---|
| 2019/0372149 A1 | 12/2019 | Cho et al. |
| 2020/0006819 A1 | 1/2020 | Lee et al. |
| 2020/0395631 A1 | 12/2020 | Kim et al. |
| 2021/0104773 A1 | 4/2021 | Ozawa et al. |
| 2022/0140383 A1 | 5/2022 | Kim |

FOREIGN PATENT DOCUMENTS

| | | |
|---|---|---|
| EP | 3605702 A2 | 2/2020 |
| JP | H07-169507 A | 7/1995 |
| JP | 2000138048 A | 5/2000 |
| JP | 2003-077494 A | 3/2003 |
| JP | 2006-185631 A | 7/2006 |
| JP | 2010-121029 A | 6/2010 |
| JP | 2010219351 A | 9/2010 |
| JP | 2011100622 A | 5/2011 |
| JP | 2018185883 A | 11/2018 |
| JP | 2020509565 A | 3/2020 |
| KR | 10-2014-0145450 A | 12/2014 |
| KR | 10-1512170 B1 | 4/2015 |
| KR | 10-2016-0115912 A | 10/2016 |
| KR | 10-2017-0142979 A | 12/2017 |
| KR | 10-2019-0030176 A | 3/2019 |
| KR | 10-2017-0055325 A | 5/2019 |
| KR | 10-2020-0050817 A | 5/2020 |
| KR | 10-2020-0141865 A | 12/2020 |
| KR | 10-2219741 B1 | 2/2021 |
| WO | 2015-084940 A1 | 6/2015 |
| WO | 2016199805 A1 | 12/2016 |
| WO | 2019151363 A1 | 8/2019 |
| WO | 2020/036055 A1 | 2/2020 |

* cited by examiner

Solid electrolyte membrane

Solid electrolyte

Additive having linear structure

SOLID ELECTROLYTE MEMBRANE AND ALL-SOLID-STATE BATTERY COMPRISING THE SAME

CROSS-REFERENCE TO RELATED APPLICATION(S)

This application is a National Stage Application of International Application No. PCT/KR2022/095120, filed on Aug. 24, 2022, which claims the benefit of priority based on Korean Patent Application No. 10-2021-0114511 filed on Aug. 30, 2021, the disclosures of which are incorporated herein by reference in their entirety.

FIELD

The present disclosure relates to a solid electrolyte membrane and an all-solid-state battery comprising the same.

BACKGROUND

A secondary battery refers to a device that converts external electrical energy into chemical energy, and then stores it, and generates electricity when needed. It is also called a rechargeable battery, meaning it can be recharged multiple times. Commonly used secondary batteries comprise a lead-acid battery, a nickel-cadmium battery (NiCd), a nickel-hydrogen battery (NiMH), and a lithium secondary battery. The secondary batteries provide both economic and environmental advantages over primary batteries that are used once and then discarded.

Meanwhile, as wireless communication technology is gradually developed, the light weight, thinning, miniaturization, etc. of portable devices or automobile accessories are required, and thus the demand for secondary batteries used as energy sources for these devices is increasing. In particular, as hybrid vehicles and electric vehicles are put into practical use in terms of preventing environmental pollution, there are researches to reduce the manufacturing cost and weight of the battery and to extend the lifetime, by using secondary batteries in batteries for these next-generation vehicles. Among various secondary batteries, a lithium secondary battery that is lightweight, exhibits high energy density and operating potential, and has a long cycle lifetime, has recently been in the spotlight.

In general, the lithium secondary battery is manufactured by mounting an electrode assembly composed of a negative electrode, a positive electrode, and a separator inside a cylindrical or prismatic metal can or a pouch-type case of an aluminum laminate sheet, and injecting electrolyte into the electrode assembly.

However, in the case of the lithium secondary battery, since a case having a certain space, such as a cylindrical shape, a square shape, or a pouch shape, is required, there is a limitation in developing various types of portable devices. Accordingly, there is a need for a novel type lithium secondary battery that is easily deformable. In particular, as an electrolyte comprised in the lithium secondary battery, there is a need for an electrolyte with excellent ion conductivity and no risk of leakage.

As an electrolyte for the conventional lithium secondary battery, a liquid-state electrolyte in which a lithium salt is dissolved in a non-aqueous organic solvent has been mainly used. However, in the case of such a liquid-state electrolyte, there is a high possibility that the electrode material is degraded and the organic solvent is volatilized, and also combustion or explosion occurs due to an increase in ambient temperature and the temperature of the battery itself, and there is a risk of leakage, making it difficult to implement various types of lithium secondary batteries with high safety.

Meanwhile, an all-solid-state battery using a solid electrolyte has an advantage that an electrode assembly in a safe and simple form can be manufactured because organic solvents are excluded.

However, the all-solid-state battery has limitations in that the actual energy density and output do not reach that of a lithium secondary battery using a conventional liquid electrolyte. In the case of the all-solid-state battery, since an electrolyte membrane containing a solid electrolyte is located between the positive electrode and the negative electrode, it is bulky and heavy compared to the conventional lithium secondary battery, and thus the energy density per volume and the energy density per weight are lowered. To prevent these problems, if the electrolyte membrane is made thin, a short circuit between the positive electrode and the negative electrode may occur.

Therefore, it is necessary to develop an electrolyte membrane having excellent ion conductivity as well as having excellent mechanical strength to maintain a stable state between electrodes.

RELATED ARTS

Korean Patent Publication No. 10-2016-0115912
  Korean Patent Registration No. 10-1512170

SUMMARY

Technical Problem

Accordingly, the inventors of the present disclosure have conducted research from various angles to solve the above problems, and as a result, have confirmed that ion conductivity and strength of a solid electrolyte membrane in the form of a thin film could be improved when an additive having a linear structure was comprised in the solid electrolyte membrane, thereby completing the present disclosure.

Therefore, it is an object of the present disclosure to provide a solid electrolyte membrane for an all-solid-state battery with excellent ion conductivity and strength.

In addition, it is another object of the present disclosure to provide an all-solid-state battery comprising the solid electrolyte membrane.

Technical Solution

In order to achieve the above objects, the present disclosure provides a solid electrolyte membrane for an all-solid-state battery, the solid electrolyte membrane comprising a solid electrolyte in the form of particles and an additive having a linear structure.

In addition, the present disclosure provides an all-solid-state battery comprising a positive electrode, a negative electrode, and the solid electrolyte membrane of the present disclosure between the positive electrode and the negative electrode.

Advantageous Effects

Since the solid electrolyte membrane for an all-solid-state battery of the present disclosure comprises the additive having a linear structure, it has excellent mechanical strength even in a thin thickness of 50 μm or less, and has the effect of improving energy density and ion conductivity.

DETAILED DESCRIPTION

Figure 1:
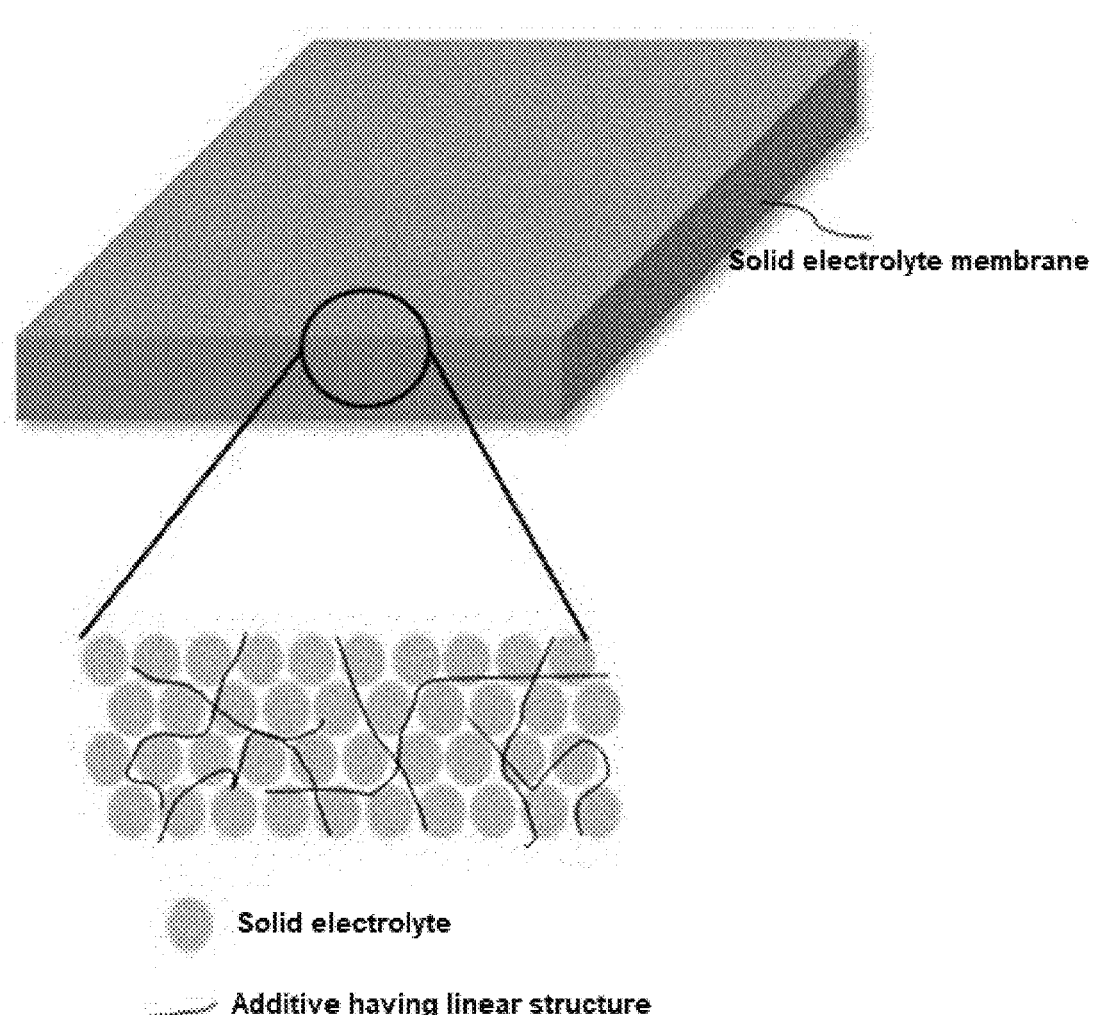
FIG. 1 is a view showing the solid electrolyte membrane for an all-solid-state battery of the present disclosure.
Figure 2:
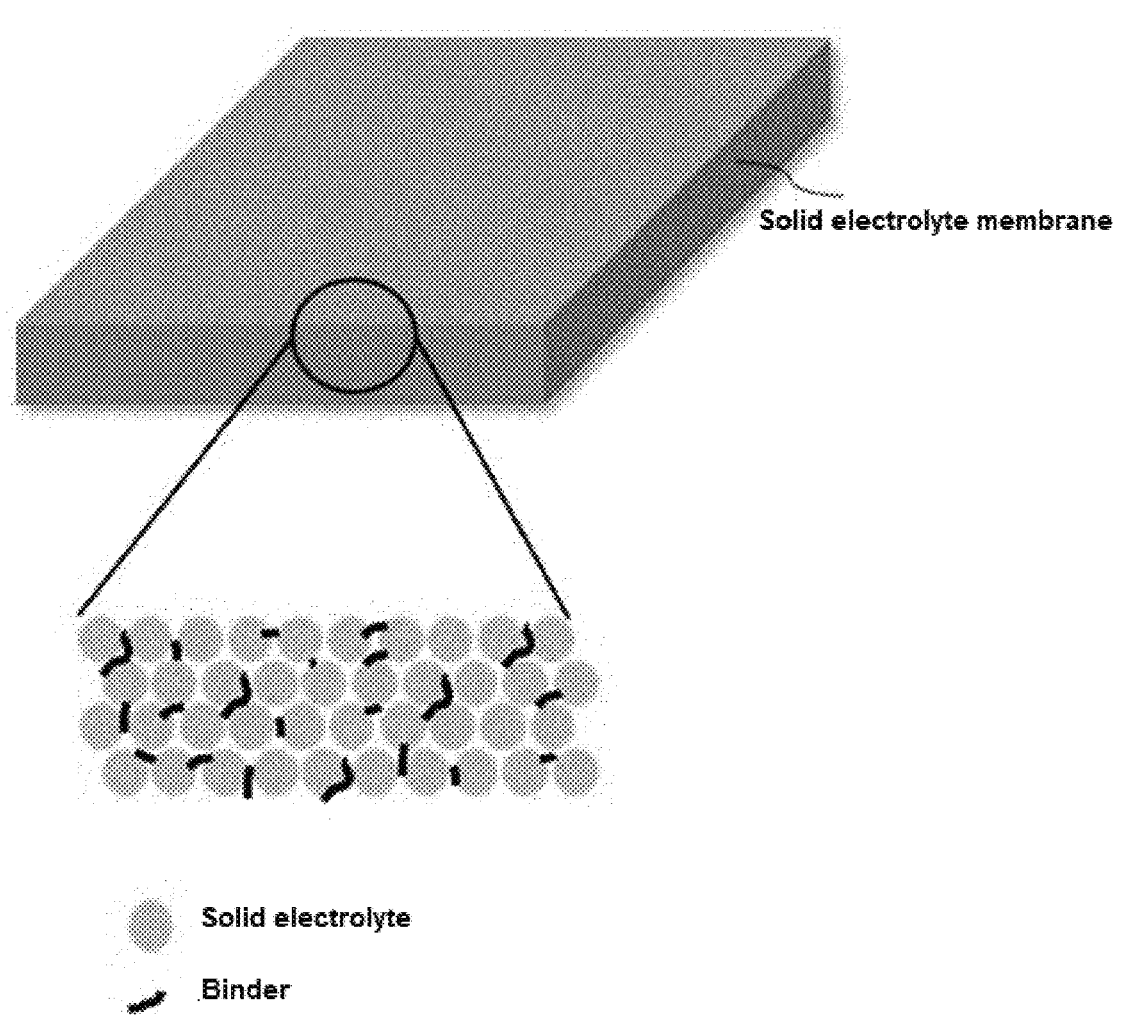
FIG. 2 is a view showing the solid electrolyte membrane for an all-solid-state battery comprising the binder of Comparative Example 2.
Figure 3:
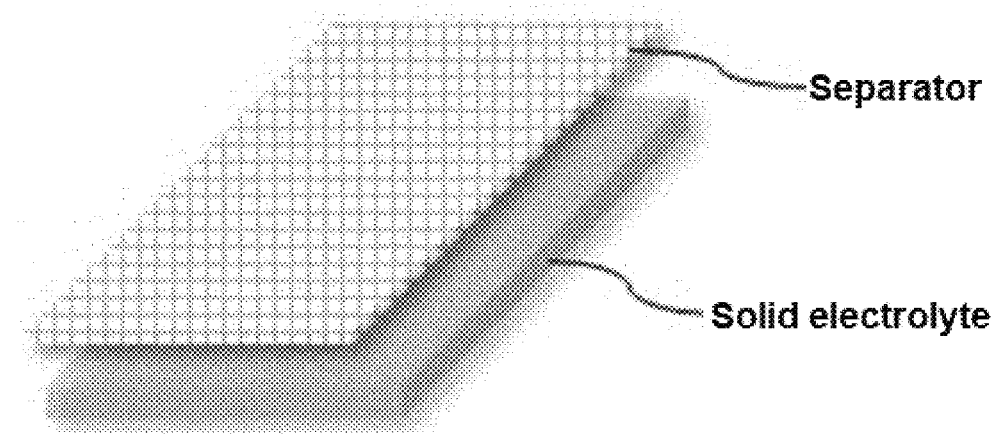
FIG. 3 is a diagram showing the solid electrolyte membrane for an all-solid-state battery comprising the separator of Comparative Example 4.
Figure 4:
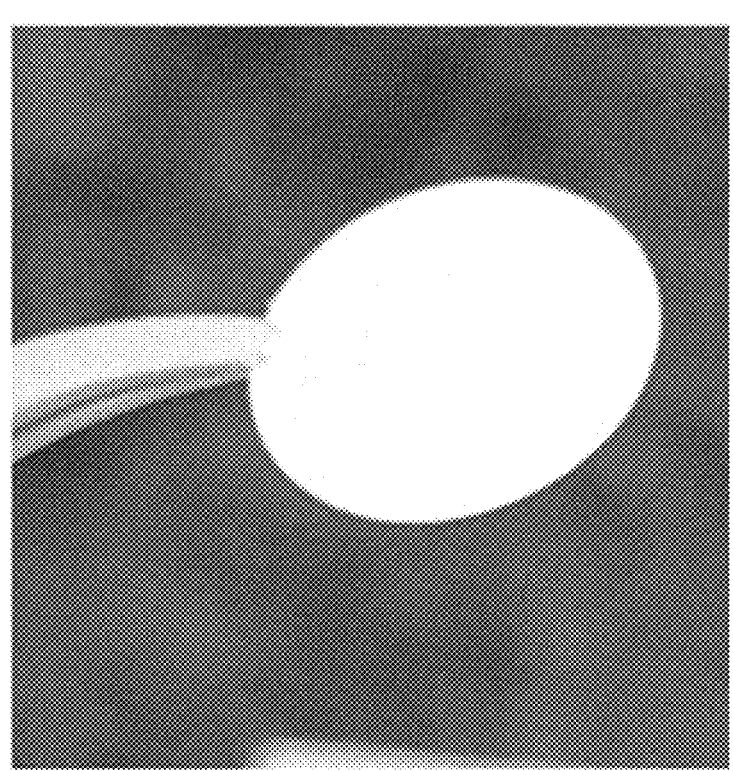
FIG. 4 is a photograph of the solid electrolyte membrane of Example 1.
Figure 5:
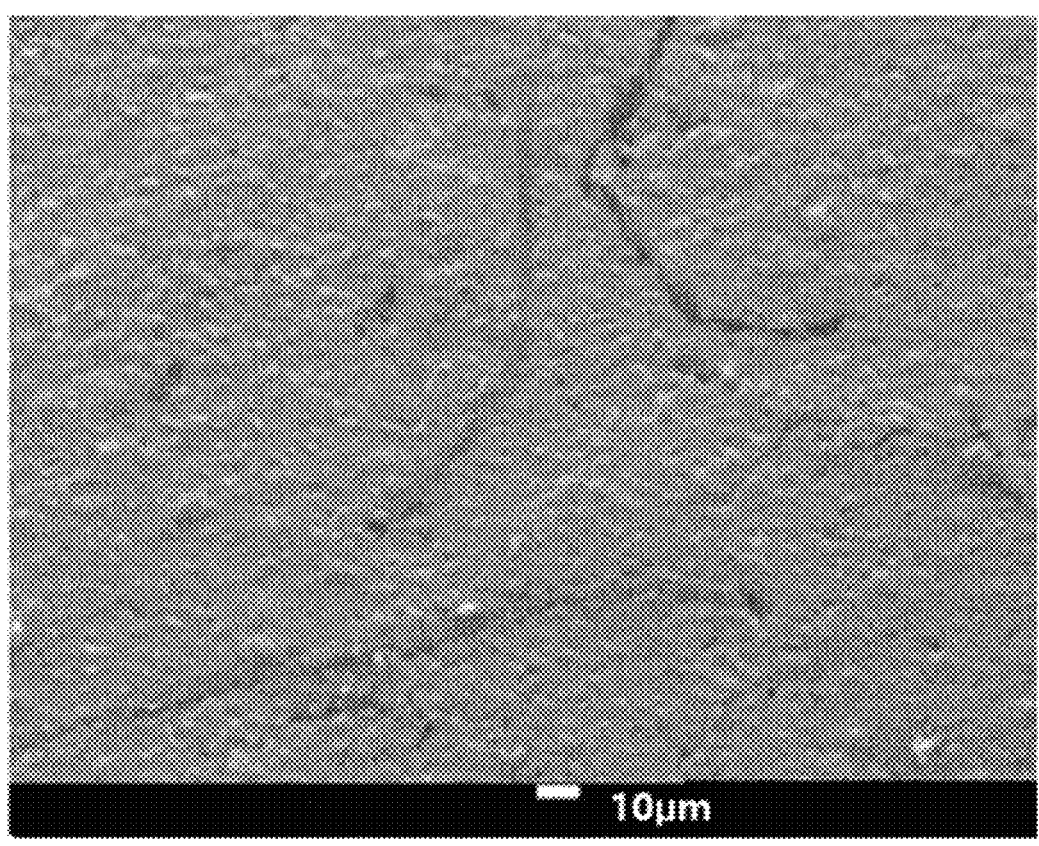
FIG. 5 is an SEM photograph of the surface of the solid electrolyte membrane of Example 1.
Figure 6:
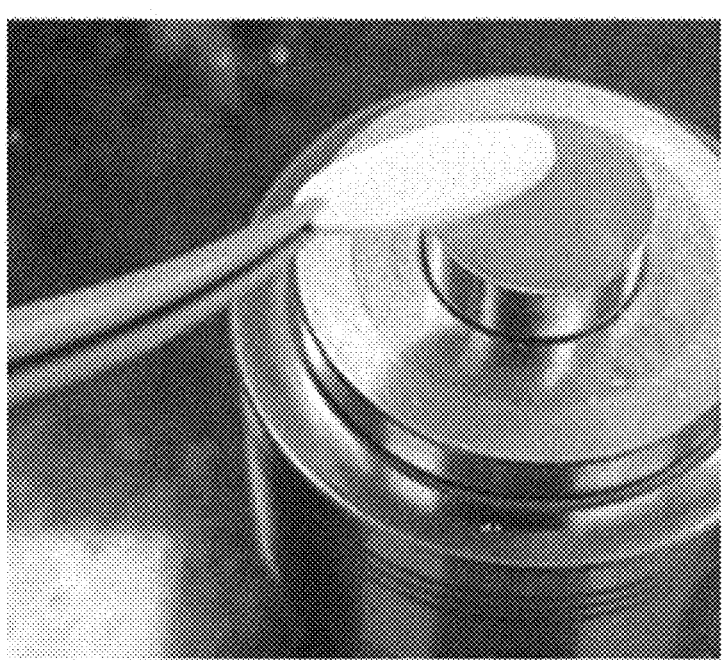
FIG. 6 is a photograph of the solid electrolyte membrane of Comparative Example 1.
Figure 7:
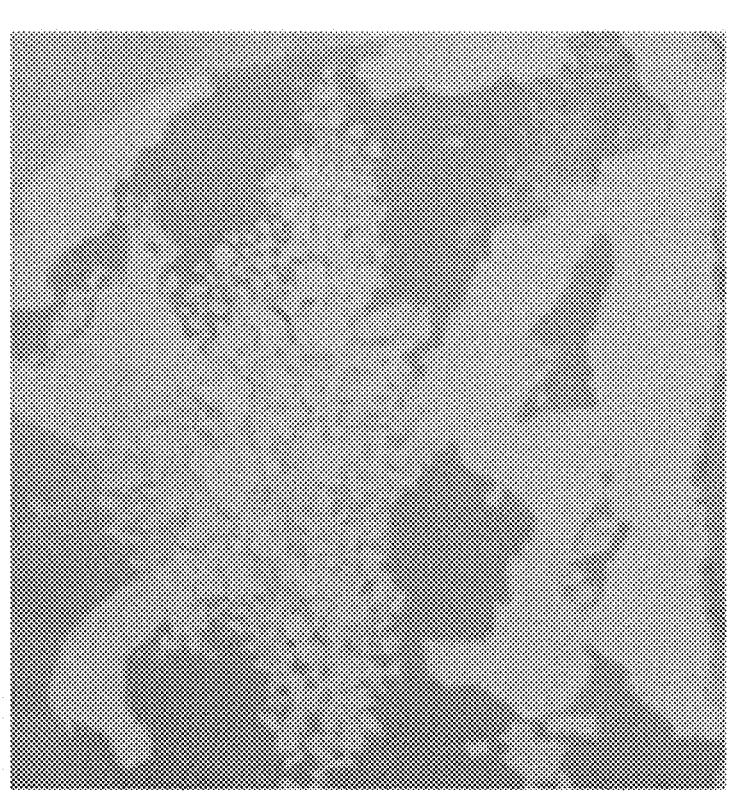
FIG. 7 is a photograph of the surface of the solid electrolyte membrane of Comparative Example 1.
Figure 8:
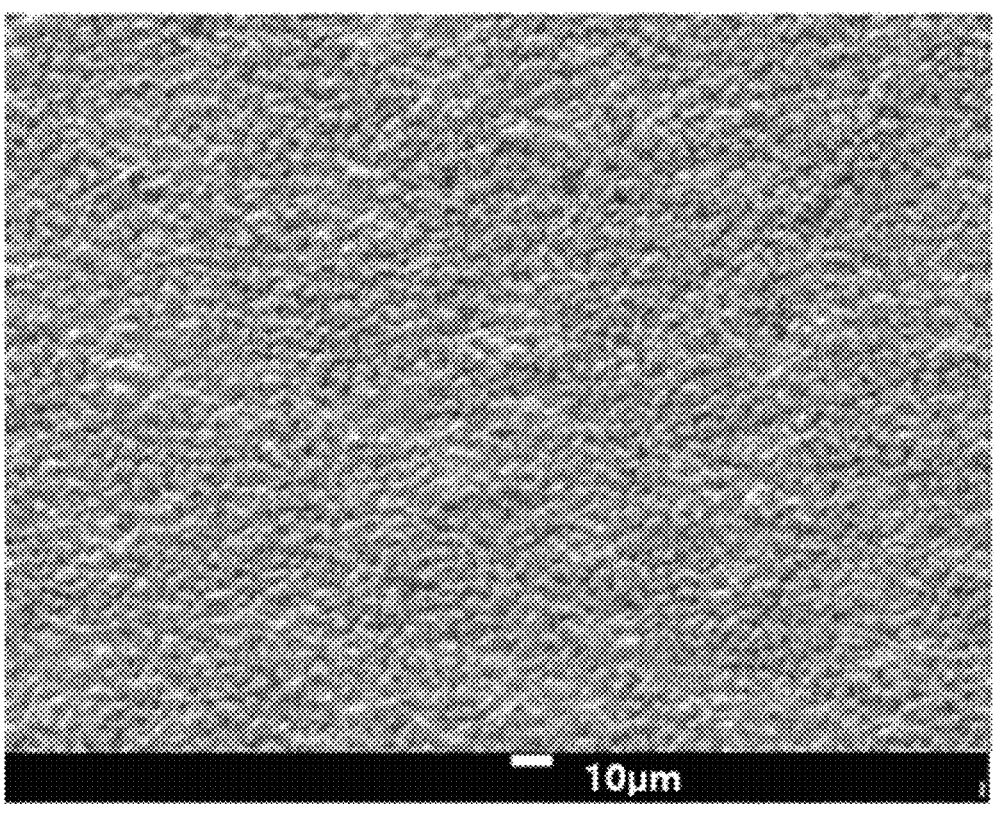
FIG. 8 is an SEM photograph of the surface of the solid electrolyte membrane of Comparative Example 1.
Figure 9:
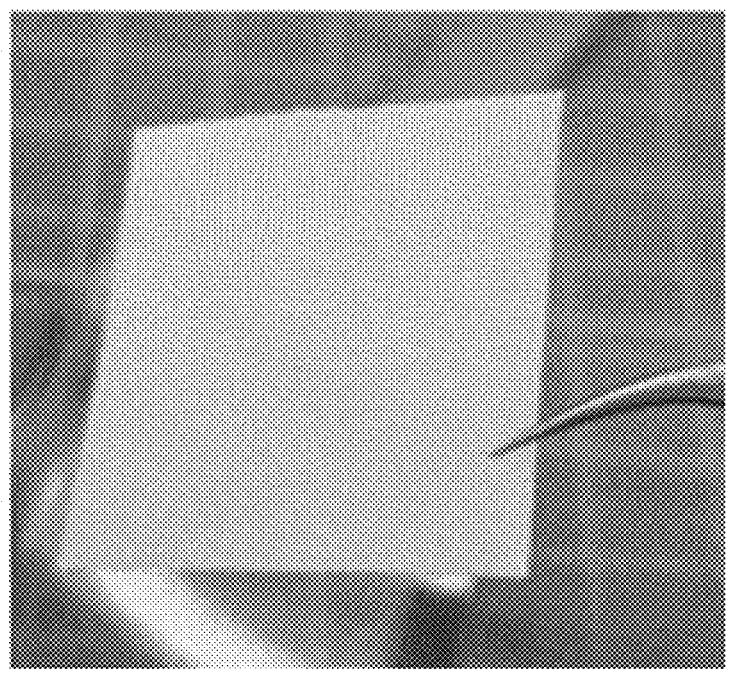
FIG. 9 is a photograph of the solid electrolyte membrane of Comparative Example 2.
Figure 10:
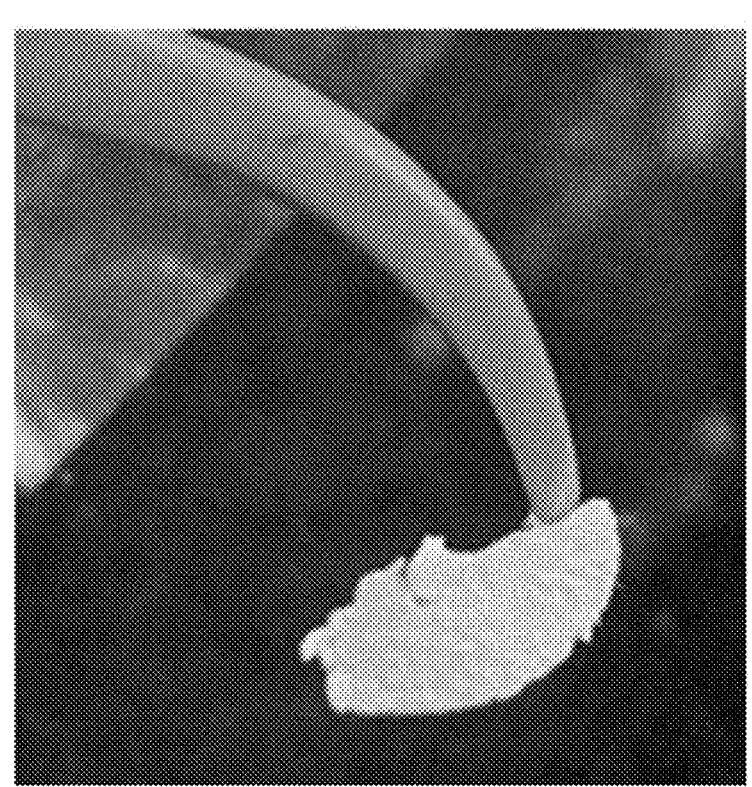
FIG. 10 is a photograph of the solid electrolyte membrane of Comparative Example 3.
Figure 11:
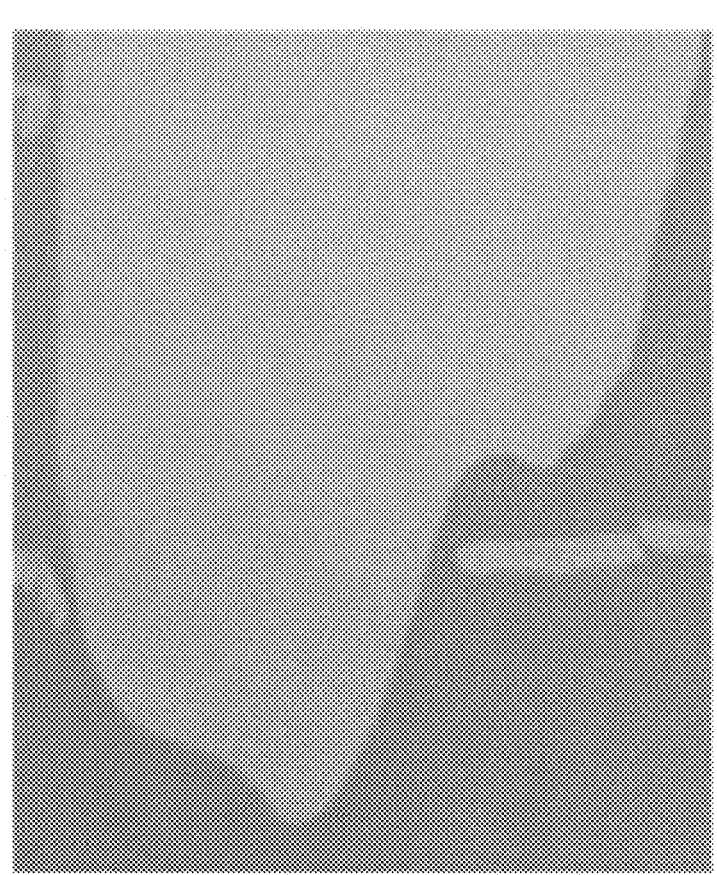
FIG. 11 is a photograph of the surface of the solid electrolyte membrane of Comparative Example 4.
Figure 12:
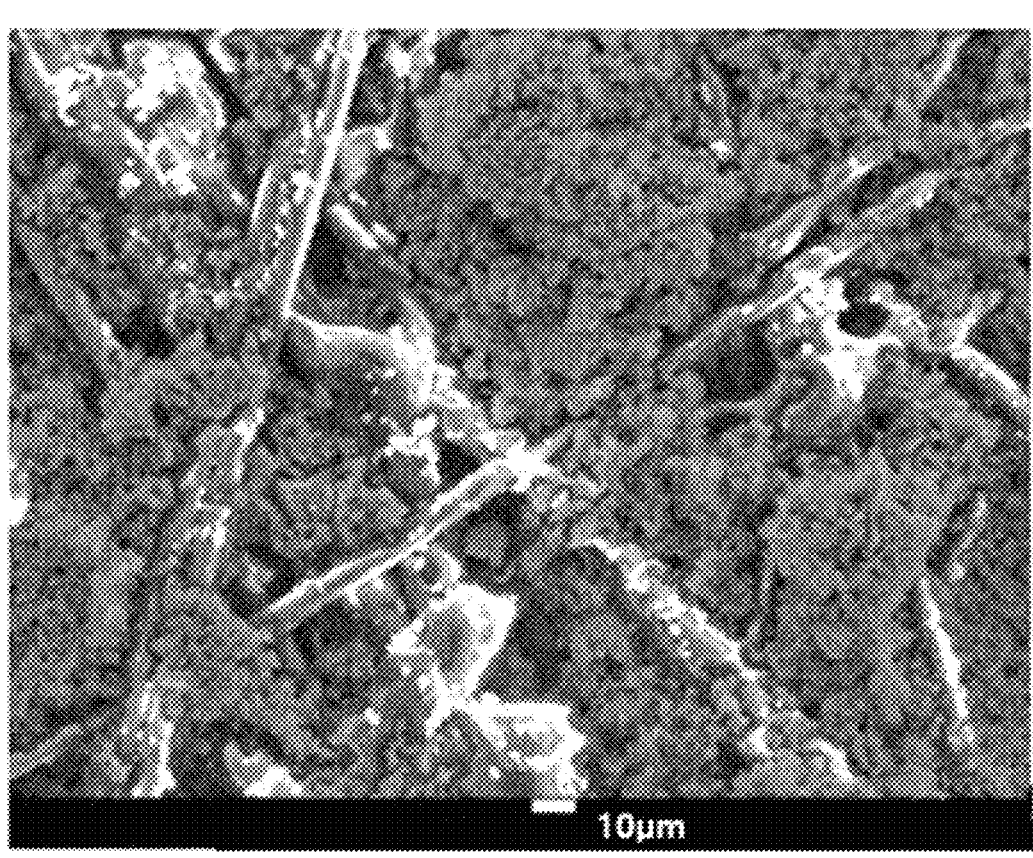
FIG. 12 is an SEM photograph of the surface of the solid electrolyte membrane of Comparative Example 4.

Hereinafter, the present disclosure is described in more detail.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used herein is for the purpose of describing particular embodiments only and is not intended to be limiting of the invention. The singular forms "a," "an," and "the" comprise plural referents unless the context clearly dictates otherwise. It is to be understood that the terms such as "comprise" or "have" as used in the present specification, are intended to designate the presence of stated features, numbers, steps, operations, components, parts or combinations thereof, but not to preclude the possibility of the presence or addition of one or more other features, numbers, steps, operations, components, parts, or combinations thereof.

The lithium secondary battery has been applied to small-sized fields such as mobile phones and laptops, but recently its application fields have been expanded to medium-sized and large-sized fields such as electric vehicles and energy storage devices. In this case, unlike the small size, since the operating environment is harsh, and more batteries must be used, it is necessary to secure excellent performance and stability.

In the case of most commercially available lithium secondary batteries, a liquid electrolyte in which lithium salt is dissolved in an organic solvent is used, and the organic solvent contained in the liquid electrolyte is easy to volatilize and has flammability, and thus there is a potential risk of ignition and explosion, and there is a risk of leakage, so long-term reliability is insufficient.

Therefore, the development of an all-solid-state battery that replaces the liquid electrolyte of the lithium secondary battery with a solid electrolyte is in progress. Since the all-solid-state battery does not contain volatile organic solvents, there is no risk of explosion or fire, and it is in the spotlight as a battery capable of manufacturing high-output batteries with excellent economic feasibility and productivity.

For the all-solid-state battery, the solid electrolyte requires high ion conductivity and mechanical strength that can be processed. However, in order to secure the mechanical strength, an increase in the thickness of the solid electrolyte membrane in the form of a membrane is inevitable, and thus there is a problem that the energy density is reduced. Therefore, in order to thin the solid electrolyte membrane and secure mechanical strength at the same time, a solid electrolyte membrane with a thin film thickness of 50 μm or less and large pores and high porosity is required, but the porosity has a trade-off with strength and thickness, making it difficult to manufacture a thin film with high porosity.

Therefore, in the present disclosure, it was intended to provide a thin film solid electrolyte membrane with excellent mechanical strength and ion conductivity, by incorporating an additive having a linear structure in a solid electrolyte membrane for an all-solid-state battery.

The present disclosure relates to a solid electrolyte membrane for an all-solid-state battery, the solid electrolyte membrane comprising a solid electrolyte in the form of particles and an additive having a linear structure.

The additive having a linear structure serves as a frame that maintains the mechanical strength of the solid electrolyte membrane composed of the solid electrolyte in the form of particles. Since the additive having a linear structure is uniformly distributed in the solid electrolyte membrane, it enables to maintain excellent mechanical strength even when the solid electrolyte membrane is thinned to a thin thickness.

The additive having a linear structure may be in the form of a polymer fiber. If it is a fiber-type polymer, the type is not particularly limited, and a fiber-type polymer commonly used in the art may be used. For example, the additive may comprise one or more selected from the group consisting of polyphenylene sulfide, polyether ether ketone, polyethyleneterephthalate, polyimide, polyamide, polysulfone, polyvinylidenefluoride, polyacrylonitrile, polyethylene and polypropylene, and preferably polyphenylene sulfide. The polyphenylene sulfide is one of the super engineering plastics, and may be the most preferable because it has excellent strength and excellent physical properties such as flame retardancy, heat resistance and chemical resistance to improve the safety of the solid electrolyte membrane.

In addition, the additive having a linear structure may have an average diameter of 50 nm to 5 μm, preferably 100 nm to 3 μm, and an average length of 500 nm to 5 mm, preferably 500 nm to 1 mm. In addition, The additive having a linear structure may have a ratio of the average length to the average diameter (average length/average diameter) of 5 to 1000, preferably 10 to 200. By having the diameter and length described above, it is possible to obtain improved mechanical strength of the solid electrolyte membrane.

The additive having a linear structure of the present disclosure does not serve as a binder connecting the solid electrolyte in the form of particles, but serves as a frame that maintains the structure of the solid electrolyte membrane. Therefore, since the additive having a linear structure is not coated on the surface of the solid electrolyte in the form of particles, it may exhibit an effect of improving ion conductivity than a solid electrolyte membrane comprising a binder. In addition, since the binder is contained in a lower content than that of the binder contained in the conventional solid electrolyte membrane, the content of the solid electrolyte in the form of particles can be increased, thereby exhibiting the effect of improving the ion conductivity of the solid electrolyte membrane.

That is, the additive having a linear structure may be contained in an amount of 0.5, 1, 2, 3 or 4% by weight or more, and 1, 2, 3, 4 or 5% by weight or less with respect to the total weight of the solid electrolyte membrane. Specifically, the additive having a linear structure may be contained in an amount of 0.5 to 5% by weight, preferably 1 to 3% by weight.

Within the above range, the mechanical strength and excellent ion conductivity of the solid electrolyte membrane may be exhibited. If the additive having a linear structure is contained in an amount of less than 0.5% by weight, the mechanical strength of the solid electrolyte membrane is lowered, making it difficult to maintain the structure of the solid electrolyte membrane. If the additive having a linear structure is contained in an amount exceeding 5% by weight, there may be a problem that the content of the solid electrolyte in the form of particles is reduced, and thereby the ion conductivity of the solid electrolyte membrane is significantly reduced.

The solid electrolyte membrane for an all-solid-state battery of the present disclosure can provide a solid electrolyte membrane having excellent mechanical strength and ion conductivity while having a thin film by comprising the additive having a linear structure described above.

More specifically, the ion conductivity of the solid electrolyte membrane for the all-solid-state battery of the present disclosure may be 0.01 to 10 mS/cm, preferably 0.1 to 5 mS/cm.

In the present disclosure, the mechanical strength of the solid electrolyte membrane for the all-solid-state battery means the degree to which the solid electrolyte membrane for the all-solid-state battery can maintain its structure (free-standing).

In addition, a thickness of the solid electrolyte membrane for the all-solid-state battery may be 5 to 50 μm, preferably 10 to 30 μm. As described above, as the solid electrolyte membrane has a thickness of the thin film, an effect of improving the energy density may be exhibited.

The solid electrolyte in the form of particles may be a sulfide-based solid electrolyte or a polymer-based solid electrolyte, preferably a sulfide-based solid electrolyte in the form of particles.

The sulfide-based solid electrolyte contains sulfur (S) and has ionic conductivity of a metal belonging to Group 1 or Group 2 of the periodic table, which may comprise Li—P—S-based glass or Li—P—S-based glass ceramics. Non-limiting examples of such sulfide-based solid electrolyte may be $Li_2S$—$P_2S_5$, $Li_2S$—$LiI$—$P_2S_5$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2S_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$, or $Li_2S$—$GeS_2$—$ZnS$, and may comprise one or more of them. However, the present disclosure is not particularly limited thereto.

The polymer-based solid electrolyte is a composite of lithium salt and polymer resin, that is, a polymer electrolyte material formed by adding polymer resin to a solvated lithium salt, which may exhibit an ion conductivity of about $1 \times 10^{-7}$ S/cm or more, preferably about $1 \times 10^{-5}$ S/cm or more.

Non-limiting examples of the polymer resin may comprise polyether-based polymer, polycarbonate-based polymer, acrylate-based polymer, polysiloxane-based polymer, phosphazene-based polymer, polyethylene derivative, alkylene oxide derivative such as polyethylene oxide, phosphoric acid ester polymer, poly agitation lysine, polyester sulfide, polyvinyl alcohol, polyvinylidene fluoride, and polymers comprising ionic dissociation groups, and may comprise one or more of them. In addition, the polymer electrolyte is a polymer resin, and may be, for example, a branched copolymer obtained by copolymerizing an amorphous polymer such as PMMA, polycarbonate, polysiloxane (PDMS) and/or phosphazene as a comonomer on a PEO (polyethylene oxide) main chain, a comb-like polymer and a cross-linked polymer resin, and may comprise one or more of them.

In the electrolyte of the present disclosure, the aforementioned lithium salt is an ionizable lithium salt and may be expressed as $Li^+X^-$. The anion of the lithium salt is not particularly limited, but may be, for example, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(F_5)_3C^-$, $(CF_3SO_2)_3C^-$, $CF_3$ $(CF_2)_7SO_3^-$, $CF_3CO_2^-$, $CH_3CO_2^-$, $SCN^-$, $(CF_3CF_2 SO_2)_2N^-$, etc.

The solid electrolyte in the form of particles may be contained in an amount of 95 to 99.5% by weight, preferably 97 to 99% by weight, based on the total weight of the solid electrolyte membrane.

In addition, the present disclosure relates to an all-solid-state battery comprising a positive electrode, a negative electrode, and a solid electrolyte membrane therebetween, wherein the solid electrolyte membrane may be the solid electrolyte membrane of the present disclosure described above.

The all-solid-state battery is a lithium secondary battery, which is not limited with respect to a positive electrode or a negative electrode and may be a lithium-air battery, a lithium oxide battery, a lithium-sulfur battery, or a lithium metal battery.

The positive electrode may include a positive electrode current collector and a positive electrode active material coated on one or both surfaces of the positive electrode current collector.

The positive electrode current collector is for supporting the positive electrode active material and is not particularly limited as long as it is electrochemically stable in the voltage range of the lithium secondary battery while having excellent conductivity. For example, the positive electrode current collector may be one or more metals selected from the group consisting of copper, aluminum, stainless steel, titanium, silver, palladium, nickel, alloys thereof, and combinations thereof, and the stainless steel may be surface-treated with carbon, nickel, titanium, or silver, and the alloy may preferably be an aluminum-cadmium alloy. In addition, sintered carbon, a non-conductive polymer surface-treated with an electrically conductive material, or a conductive polymer may be used.

The positive electrode current collector can have minute irregularities formed on its surface to enhance the bonding force with the positive electrode active material, and may be formed in various forms such as film, sheet, foil, mesh, net, porous body, foam, nonwoven fabric or the like.

The positive electrode active material layer may include a positive electrode active material and optionally a conductive material and a binder.

The positive electrode active material may vary depending on the type of the all-solid-state battery. For example, the positive electrode active material may be, but is not limited to, layered compounds such as lithium cobalt oxide (LiCoO$_2$) and lithium nickel oxide (LiNiO$_2$) or compounds substituted with one or more transition metals; lithium manganese oxides such as formula Li$_{1-x}$Mn$_{2-x}$O$_4$ (0≤x≤0.33), LiMnO$_3$, LiMn$_2$O$_3$, and LiMnO$_2$; lithium copper oxide (Li$_2$CuO$_2$); vanadium oxides such as LiV$_3$O$_8$, V$_2$O$_5$, and Cu$_2$V$_2$O$_7$; Ni site type lithium nickel oxide represented by formula LiNi$_{1-x}$M$_x$O$_2$(M=Co, Mn, Al, Cu, Fe, Mg, B or Ga; 0.01≤x≤0.3); lithium manganese composite oxides represented by formula LiMn$_{2-x}$M$_x$O$_2$(M=Co, Ni, Fe, Cr, Zn or Ta; 0.01≤x≤0.1) or Li$_2$Mn$_3$MO$_8$ (M=Fe, Co, Ni, Cu or Zn); lithium-manganese composite oxides of spinel structure represented by LiNi$_x$Mn$_{2-x}$O$_4$; LiCoPO$_4$; LiFePO$_4$; elemental sulfur (S$_8$); and a sulfur-based compound such as Li$_2$S$_n$ (n≥1), an organosulfur compound or a carbon-sulfur polymer ((C$_2$S$_x$)$_n$: x=2.5~50, n≥2).

The conductive material is a material that acts as a path through which electrons move from the current collector to the positive electrode active material by electrically connecting the electrolyte and the positive electrode active material, and is not particularly limited as long as it has porosity and conductivity without causing chemical changes in the lithium secondary battery.

For example, carbon-based materials having porosity may be used as a conductive material. Such carbon-based materials may comprise carbon black, graphite, graphene, activated carbon, carbon fiber, and the like. In addition, metallic fibers such as metal mesh; metallic powder such as copper, silver, nickel, and aluminum; or organic electrically-conductive materials such as polyphenylene derivatives may be also used. The conductive materials may be used alone or in combination.

Products that are currently marketed as conductive materials may comprise acetylene black series (products from Chevron Chemical Company or Gulf Oil Company), Ketjen Black EC series (products from Armak Company), Vulcan XC-72(a product from Cabot Company) and Super P (a product from MMM). For example, acetylene black, carbon black, graphite, etc. may be used.

In addition, the positive electrode may further comprise a binder. The binder enhances adhesion force between the components constituting the positive electrode and between them and the current collector, and any binder known in the art can be used as the binder.

For example, the binder may be fluororesin-based binders comprising polyvinylidene fluoride (PVdF) or polytetrafluoroethylene (PTFE); rubber-based binders comprising styrene butadiene rubber (SBR), acrylonitrile-butadiene rubber, and styrene-isoprene rubber; cellulose-based binders comprising carboxymethylcellulose (CMC), starch, hydroxypropylcellulose, and regenerated cellulose; polyalcohol-based binders; polyolefin-based binders comprising polyethylene and polypropylene; polyimide-based binders; polyester-based binders; and silane-based binders, or mixtures or copolymers of two or more thereof.

The negative electrode comprises a negative electrode current collector and a negative electrode active material formed on negative electrode current collector. In addition, the negative electrode, like the positive electrode, may include a conductive material and a binder if necessary. At this time, the negative electrode current collector, the conductive material, and the binder are as described above.

The negative electrode active material may be any material capable of reversibly intercalating or de-intercalating lithium ion (Li$^+$), or a material capable of reacting with lithium ion to reversibly form lithium containing compounds.

For example, the negative electrode active material may comprises, but is not limited to, one or more carbon-based materials selected from the group consisting of crystalline artificial graphite, crystalline natural graphite, amorphous hard carbon, low crystalline soft carbon, carbon black, acetylene black, Ketjen black, Super-P, graphene, and fibrous carbon, Si-based material, metal composite oxides such as Li$_x$Fe$_2$O$_3$ (0≤x≤1), Li$_x$WO$_2$(0≤x≤1), Sn$_x$Me$_{1-x}$Me'$_y$O$_z$ (Me: Mn, Fe, Pb, Ge; Me': Al, B, P, Si, elements of groups 1, 2, and 3 of the periodic table, halogen; 0<x≤1; 1≤y≤3; 1≤z≤8); lithium metal; lithium alloy; silicon-based alloy; tin-based alloy; metal oxide such as SnO, SnO$_2$, PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, Bi$_2$O$_5$; an electrical conductivity polymer such as polyacetylene; Li—Co—Ni based material; titanium oxide; lithium titanium oxide and the like.

The manufacture of the all-solid-state battery is not particularly limited in the present disclosure, and a known method may be used.

For example, a cell is assembled by placing a solid electrolyte membrane between a positive electrode and a negative electrode, followed by compression-molding them. After the assembled cell is installed in the exterior material, it is sealed by heat compression or the like. Laminate packs made of aluminum, stainless steel, or the like, or cylindrical or square metal containers are used for the exterior material.

For example, the electrodes of the positive electrode and the negative electrode are manufactured through a slurry coating process of preparing a composition in the form of a slurry comprising each electrode active material, a solvent, and a binder, and coating and then drying it.

The method of coating the electrode slurry on the current collector may comprise a method of dispensing the electrode slurry on the current collector and uniformly dispersing the electrode slurry using a doctor blade or the like, and methods such as die casting, comma coating, and screen printing. In addition, the electrode slurry may be bonded to the current collector by pressing or lamination after molding on a separate substrate. In that case, the thickness of the coating to be finally coated can be adjusted by adjusting the concentration of the slurry solution, the number of coatings, and the like.

The drying process is a process for removing the solvent and moisture in the slurry for drying the slurry coated on the metal current collector, and may vary depending on the solvent used. For example, the drying process is carried out in a vacuum oven at 50 to 200° C. Examples of the drying method may comprise a drying method by warm air, hot air, or low-humidity air, a vacuum drying method, and a drying method by irradiation with (far)-infrared radiation or electron beam. The drying time is not particularly limited, but is usually in the range of 30 seconds to 24 hours.

After the drying process, a cooling process may be further included, and the cooling process may be a cooling process which slowly cool to room temperature so that a recrystallized structure of the binder is well formed.

In addition, if necessary, in order to increase the capacity density of the electrode and to increase the adhesion between the current collector and the active materials after the drying process, a rolling process in which the electrode is passed between two rolls heated at a high temperature and is compressed to a desired thickness can be performed. The rolling process is not particularly limited in the present disclosure, and a known rolling process is possible. For example, the rolling process is carried out by passing between rotating rolls or by using a flat press machine.

The shape of the all-solid-state battery is not particularly limited, and may have various shapes such as a cylindrical shape, a stacked type, and a coin type.

Hereinafter, preferred examples of the present disclosure will be described in order to facilitate understanding of the present disclosure. It will be apparent to those skilled in the art, however, that the following examples are illustrative of the present disclosure and that various changes and modifications can be made within the scope and spirit of the present disclosure. Such variations and modifications are within the scope of the appended claims.

<Manufacture of Solid Electrolyte Membrane for All-Solid-State Battery>

EXAMPLE 1

98.5% by weight of argyrodite ($Li_6PS_5Cl$) as a solid electrolyte and 1.5% by weight of polyphenylene sulfide as an additive having a linear structure were used, and these were dispersed and stirred in anisole to prepare a slurry for forming a solid electrolyte layer.

Polyethylene terephthalate was used as a release film, and the slurry for forming a solid electrolyte layer was coated on the release film, dried in a vacuum at a temperature of 100° C. for 12 hours, and then rolled to form a solid electrolyte membrane for an all-solid-state battery having a thickness of 38 μm.

EXAMPLE 2

A solid electrolyte membrane for an all-solid-state battery having a thickness of 45 μm was prepared in the same manner as in Example 1 above, except that 97% by weight of argyrodite ($Li_6PS_5Cl$), and 3% by weight of polyphenylene sulfide are used.

EXAMPLE 3

A solid electrolyte membrane for an all-solid-state battery having a thickness of 40 μm was prepared in the same manner as in Example 1 above, except that 95% by weight of argyrodite ($Li_6PS_5Cl$), and 5% by weight of polyphenylene sulfide are used.

Comparative Example 1

Argyrodite ($Li_6PS_5Cl$) was used alone as a solid electrolyte, and it was filled between titanium molds (Ti molds) to prepare a solid electrolyte membrane for an all-solid-state battery with a thickness of 732 μm.

Comparative Example 2

95% by weight of argyrodite ($Li_6PS_5Cl$) as a solid electrolyte and 5% by weight of polytetrafluoroethylene as a binder were used, and it was dispersed in anisole and stirred to prepare a slurry for forming a solid electrolyte layer.

Polyethylene terephthalate was used as a release film, and a slurry for forming a solid electrolyte layer was coated on the release film, dried in a vacuum at a temperature of 100°

C. for 12 hours to prepare a solid electrolyte membrane for an all-solid-state battery having a thickness of 50 μm.

Comparative Example 3

The same procedure as in Comparative Example 1 above was carried out, except for using 97% by weight of argyrodite ($Li_6PS_5Cl$), and 3% by weight of polytetrafluoroethylene. However, due to the low content of the binder, the strength was lowered and thus the structure could not be maintained and as a result, it was broken.

Comparative Example 4

A solid electrolyte membrane for an all-solid-state battery with a thickness of 49 μm was prepared in the same manner as in Example 1 above, except that a nonwoven fabric (porosity of 48%, thickness of 38 μm) is used instead of the additive having a linear structure.

Experimental Example 1: Measurement of Ion Conductivity of Solid Electrolyte Membrane for All-Solid-State Battery The ion conductivity of the solid electrolyte membrane for the all-solid-state battery prepared in Examples 1 to 3 and Comparative Examples 1, 2 and 4 was measured.

After interposing the solid electrolyte membranes for the all-solid-state battery of Examples 1 to 3 and Comparative Examples 1, 2 and 4 between SUS, respectively, the ion resistance was measured by impedance spectroscopy at room temperature, the value of ion conductivity was calculated, and the results are shown in Table 1 below.

TABLE 1

| | Thickness (μm) | Area (cm$^2$) | Resistance (Ohm) | Ion conductivity (mS/cm) |
|---|---|---|---|---|
| Example 1 | 38 | 1.77 | 3 | 0.72 |
| Example 2 | 45 | 1.77 | 3.8 | 0.67 |
| Example 3 | 40 | 1.77 | 4.2 | 0.54 |
| Comparative Example 1 | 732 | 1.77 | 23.4 | 1.77 |
| Comparative Example 2 | 50 | 1.77 | 8.2 | 0.35 |
| Comparative Example 4 | 49 | 1.77 | 10.7 | 0.26 |

From the results of Table 1, it was confirmed that the ion conductivity of the solid electrolyte membranes of Examples 1 to 3 comprising the additive having a linear structure that supports the solid electrolyte is excellent. In addition, it was found that it is possible to maintain the structure of the solid electrolyte membrane (free-standing) even if a small amount of additives of 0.5 to 5% by weight are comprised.

Meanwhile, in the case of Comparative Example 1 using only solid electrolyte, when slurry coating was carried out to produce a thin film, the thin film was broken and it was impossible to measure the ion conductivity. When a solid electrolyte membrane of the above thickness was prepared using a mold for measurement of ion conductivity, high ion conductivity was shown. That is, Comparative Example 1 had high ion conductivity, but it was found that thin film formation was impossible.

In the case of the solid electrolyte membrane of Comparative Example 2 using a binder instead of the additive having a linear structure, it was found that the ion conductivity was lower than that of the solid electrolyte membrane of Example 3 using the same amount of the additive having a linear structure, and the solid electrolyte membrane of Comparative Example 3 did not maintain the structure of the solid electrolyte membrane because of the low binder content.

Comparative Example 4 using a nonwoven fabric instead of the additive having a linear structure showed lower ion conductivity than Examples 1 to 3. Although the nonwoven fabric is connected as a linear structure, since it was difficult to completely fill the solid electrolyte in the pores between the fibers, the results mentioned above were shown. If the nonwoven fabric is used, there may also be a problem that the adhesive strength between the electrodes is limited.

Therefore, it can be seen that the solid electrolyte membrane for the all-solid-state battery of the present disclosure can be thinned and exhibit high ion conductivity.

The invention claimed is:

1. A solid electrolyte membrane for an all-solid-state battery, the solid electrolyte membrane comprising a solid electrolyte in the form of particles and an additive having a linear structure, wherein the additive having a linear structure is at least one selected from the group consisting of polyphenylene sulfide, polyetheretherketone, polyethyleneterephthalate, polysulfone, polyacrylonitrile, polyethylene, and polypropylene,

wherein the additive having a linear structure has an average length of 500 nm to 1 mm, and an average diameter of 50 nm to 5 μm, and a ratio of the average length to the average diameter of 10 to 200.

2. The solid electrolyte membrane according to claim 1, wherein the additive having a linear structure is in the form of a polymer fiber.

3. The solid electrolyte membrane according to claim 1, wherein the additive having a linear structure is contained in an amount of 0.5 to 5% by weight based on the total weight of the solid electrolyte membrane.

4. The solid electrolyte membrane according to claim 1, wherein the solid electrolyte is a sulfide-based solid electrolyte or a polymer-based solid electrolyte.

5. The solid electrolyte membrane according to claim 1, wherein a thickness of the solid electrolyte membrane is 5 μm to 50 μm.

6. The solid electrolyte membrane according to claim 1, wherein an ion conductivity of the solid electrolyte membrane is 0.01 mS/cm to 10 mS/cm.

7. An all-solid-state battery comprising a positive electrode, a negative electrode, and the solid electrolyte membrane according to claim 1 between the positive electrode and the negative electrode.

* * * * *